United States Patent
Ok et al.

(10) Patent No.: US 7,545,533 B2
(45) Date of Patent: Jun. 9, 2009

(54) APPARATUS AND METHOD FOR CONTROLLING COLORS OF COLOR IMAGE

(75) Inventors: Hyun-wook Ok, Yongin-si (KR); Won-hee Choe, Gyeongju-si (KR); Chang-yeong Kim, Yongin-si (KR); Du-sik Park, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 984 days.

(21) Appl. No.: 10/993,158

(22) Filed: Nov. 22, 2004

(65) Prior Publication Data
US 2005/0219574 A1 Oct. 6, 2005

(30) Foreign Application Priority Data
Nov. 20, 2003 (KR) .................. 10-2003-0082770

(51) Int. Cl.
*H04N 1/60* (2006.01)
*G03F 3/10* (2006.01)
*G06K 9/00* (2006.01)
*G06K 9/40* (2006.01)

(52) U.S. Cl. ............... 358/1.9; 358/518; 358/520; 358/527; 382/162; 382/167; 382/264

(58) Field of Classification Search .......... 358/1.9, 358/518, 520, 527; 382/162, 167, 264
See application file for complete search history.

(56) References Cited

U.S. PATENT DOCUMENTS

| 5,937,089 A | 8/1999 | Kobayashi |
| 2003/0174350 A1* | 9/2003 | Kim et al. ............. 358/1.9 |
| 2005/0244051 A1* | 11/2005 | Shiohara ............. 382/162 |

FOREIGN PATENT DOCUMENTS

| EP | 1 022 897 | 7/2000 |
| JP | 10-79954 | 3/1998 |
| JP | 10-178557 | 6/1998 |
| JP | 11-232449 | 8/1999 |
| JP | 2000-244757 | 9/2000 |
| JP | 2001-28694 | 1/2001 |
| JP | 2001-218078 | 8/2001 |
| JP | 2003-47020 | 2/2003 |

* cited by examiner

*Primary Examiner*—Edward L Coles
*Assistant Examiner*—Charlotte M Baker
(74) *Attorney, Agent, or Firm*—Staas & Halsey LLP

(57) ABSTRACT

A method of and apparatus for converting a color space. The method includes: separating a color signal of a given pixel into a brightness component and a saturation component; obtaining a boundary value of the saturation component of a color gamut, to which the color signal belongs, in a first color space using the separated brightness component and saturation components; and converting the first color space into a second color space in which saturation components and hue components are independently controlled using the obtained boundary value.

46 Claims, 9 Drawing Sheets

APPARATUS AND METHOD FOR CONTROLLING COLORS OF COLOR IMAGE

CROSS-REFERENCE TO RELATED APPLICATION

This application claims the priority of Korean Patent Application No. 2003-82770, filed on Nov. 20, 2003, in the Korean Intellectual Property Office, the disclosure of which is incorporated herein by reference.

BACKGROUND OF THE INVENTION

1. Field of the Invention

The present invention relates to an apparatus and method for controlling colors of a color image, and more particularly, to an apparatus and method for controlling saturation according to the brightness or hue of each pixel and also controlling hue according to the brightness of the pixel.

2. Description of Related Art

In general, when the same color of a color image is represented by diverse image displays, output colors are different from one another due to a difference in spectral characteristics of the displays. And, even when the same color is represented by identical image displays, output colors may be different. Since the same color should be represented completely equally according to brightness or hue by the diverse displays as well as the identical displays, delicate control of color needs to be done for color matching. Such color control eliminates a color difference made between the diverse displays or between the identical displays, and with currently increasing interests in colors, meets users' demands for selective color control so that they can convert a specific color represented by a display into a preferable color.

Conventional methods of controlling colors of a color image in a color imaging system are disclosed in U.S. Pat. No. 4,525,736, U.S. Pat. No. 6,057,931, U.S. Pat. No. 6,122,012, and U.S. Pat. No. 6,476,877. U.S. Pat. No. 4,525, 736 discloses a selective color modification, which converts red (R), green (G), and blue (B) signals of a color picture into luminance (Y), in-phase(I), and quadrature (Q) signals, selects a color gamut, within which color modification is to take place, in a YIQ three-dimensional color space of the converted signals or in a two dimensional image, and adds modification amounts MY, MI, and MQ to the signals only when the three color signals are found to lie simultaneously within the selected color gamut. However, in the method a color to be controlled is difficult to select and there is a possibility of discontinuity between a selected gamut and a non-selected gamut in the color space.

U.S. Pat. No. 6,057,931 discloses a method and apparatus for controlling color image reproduction in a color printer. The method adjusts a hue-saturation-brightness (HSL) slice range, within which a color to be manually or automatically controlled falls, in an HSL color space, and controls respective color components within a set HSL slice using a transfer curve. Here, at most seven HSL slices can be set to control the color. However, since the respective color components are not independent in the HSL color space but instead correlate with one another to some degree, it is difficult to control only one desired color component. Particularly, color control cannot be achieved according to brightness or hue because of the transfer curve.

U.S. Pat. No. 6,122,012 discloses a method of selective color control of digital video images, in which the saturation and brightness of a specific color are controlled by defining a set of look up tables, each of which is a function showing saturation components of six colors, namely, red (R), green (G), blue (B), cyan (C), magenta (M), and yellow (Y), and dynamic ranges of the saturation components, and by performing a linear interpolation in the look up tables. However, this method has a drawback in that a display system should have a memory with a capacity large enough to store the huge look up tables and the look up tables should be kept for future reference. Thus, the method has a limitation in controlling colors. In addition, although the method can control colors according to hue, it cannot control the colors according to brightness.

U.S. Pat. No. 6,476,877 discloses a color correction apparatus, a color correction controller, and a color correction system. Color correction is performed by converting a color space using given RGB color signals into a color space in which H, S, and L are represented, and by performing correction between two colors obtained from different displays in the converted color space. Here, the color space is divided into six gamuts and it is determined whether the two colors lie within the same gamut. If the two colors are determined to lie within the same gamut, color correction is performed in accordance with a correction procedure for the two colors within the gamut. If the two colors are determined to lie in different gamuts, the different gamuts are combined to a single gamut so that the two colors can lie within the single gamut. Thereafter, the above correction process is repeated. In order to match the two colors having different hue and saturation in the singe gamut, other colors, marked by spots, in the gamut are also adjusted in proportion to variations in the hue and saturation components of the two colors. However, in this method, since the color gamut to be controlled has already been determined, uniformity of the color space may be severely degraded during color control. Furthermore, since the method does not consider brightness, the colors cannot be controlled according to brightness.

FIG. 1 illustrates an original YCbCr color space in which all colors, which can be combined in an RGB color space, are distributed. In the YCbCr color space, Y represents a brightness component of a color, and Cb and Cr represent saturation components. Although the brightness component and the saturation components are separately shown in the YCbCr color space, the saturation components are not constant according to brightness and hue. Accordingly, when the respective color components are controlled in accordance with a control function, the controlled components may exceed a range that allows the color to be represented. In other words, the respective color components in the YCbCr color space are not independent of each other and have a certain relation with one another. Thus, if the color is controlled without considering the relation, the color may not be represented.

FIG. 2 is a diagram illustrating an exemplary color control in the original YCbCr color space. If saturation components of colors C and A, which are marked by spots, equally increase without considering brightness, the color A is moved to a spot B and the color C is moved to a spot D. Since the modified darker color D lies within a color gamut, it can be represented by a display. However, the modified brighter color B lies outside the color gamut, and thus cannot be represented by the display. To represent the color B by means of the display, an additional process, such as clipping, should be conducted. Further, since brightness components and saturation components, which are color components in the YCbCr color space, affect each other, their relation needs to be considered during color control.

Conversely, human beings can perceive the difference between the brightness components and the saturation components. Therefore, it is advantageous in many ways that when colors of an image are processed, a color signal is represented with the brightness components and saturation components. In a hue-saturation-value (HSV) color space or a hue-saturation-intensity (HSI) color space based on this concept, however, the respective color components are not independent. Accordingly, it is not easy to control the color components.

BRIEF SUMMARY

An aspect of the present invention provides a method of expanding and converting an original color space, to which a color image belongs, into a modified color space in which respective color components are independent.

An aspect of the present invention also provides an apparatus and method for controlling colors by converting an original color space, to which a color image belongs, into a modified color space in which respective color components are independent so that a user can modify a desired color component in the color image without changing other color components.

According to an aspect of the present invention, there is provided a method of converting a color space, including: separating a color signal of a given pixel into a brightness component and a saturation component; obtaining a boundary value of the saturation component of a color gamut, to which the color signal belongs, in a first color space using the separated brightness component and saturation components; and converting the first color space into a second color space in which saturation components and hue components are independently controlled using the obtained boundary value.

According to another aspect of the present invention, there is provided an apparatus for controlling color components of an input color image pixel by pixel, including: a color space converting unit which obtains a boundary value of a saturation component of a color gamut to which a color signal of a given pixel belongs in a first color space, and converts the first color space into a second color space in which saturation components and hue components are independently controlled using the obtained boundary value; a color component control unit which controls color components of the given pixel according to a predetermined control variable in the second color space; and a color space reverse-converting unit which reversely converts the second color space into the first color space using the boundary value and outputs the color signal whose color components have been controlled by the color component control unit.

According to still another aspect of the present invention, there is provided a method of controlling color components of an input color image pixel by pixel, including: obtaining a boundary value of a saturation component of a color gamut to which a color signal of a given pixel belongs in a first color space, and converting the first color space into a second color space in which saturation components and hue components are independently controlled using the obtained boundary value; controlling color components according to a predetermined control variable in the second color space; and reversely converting the second color space into the first color space using the boundary value and outputting the color signal whose color components have been controlled.

According to another aspect of the present invention, there is provided a method of controlling colors of a color image, including: inputting a color control variable; inputting the color image; separating the input color image into a brightness component (Y) and saturation components (Cr, Cb) of a pixel; extracting a boundary value (Cbmax_y, Crmax_y) of the saturation component of a color gamut to which the pixel belongs in an original YCbCr color space using the brightness component and the saturation components; converting the original color space into a modified YCbCr color space by normalizing the saturation component of the pixel using the extracted boundary value; controlling color components of the pixel using the color control variable; and reverse-converting the modified color space into the original color space.

The aforementioned methods may be executed by a program stored on a computer readable recording medium.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

Figure 3:
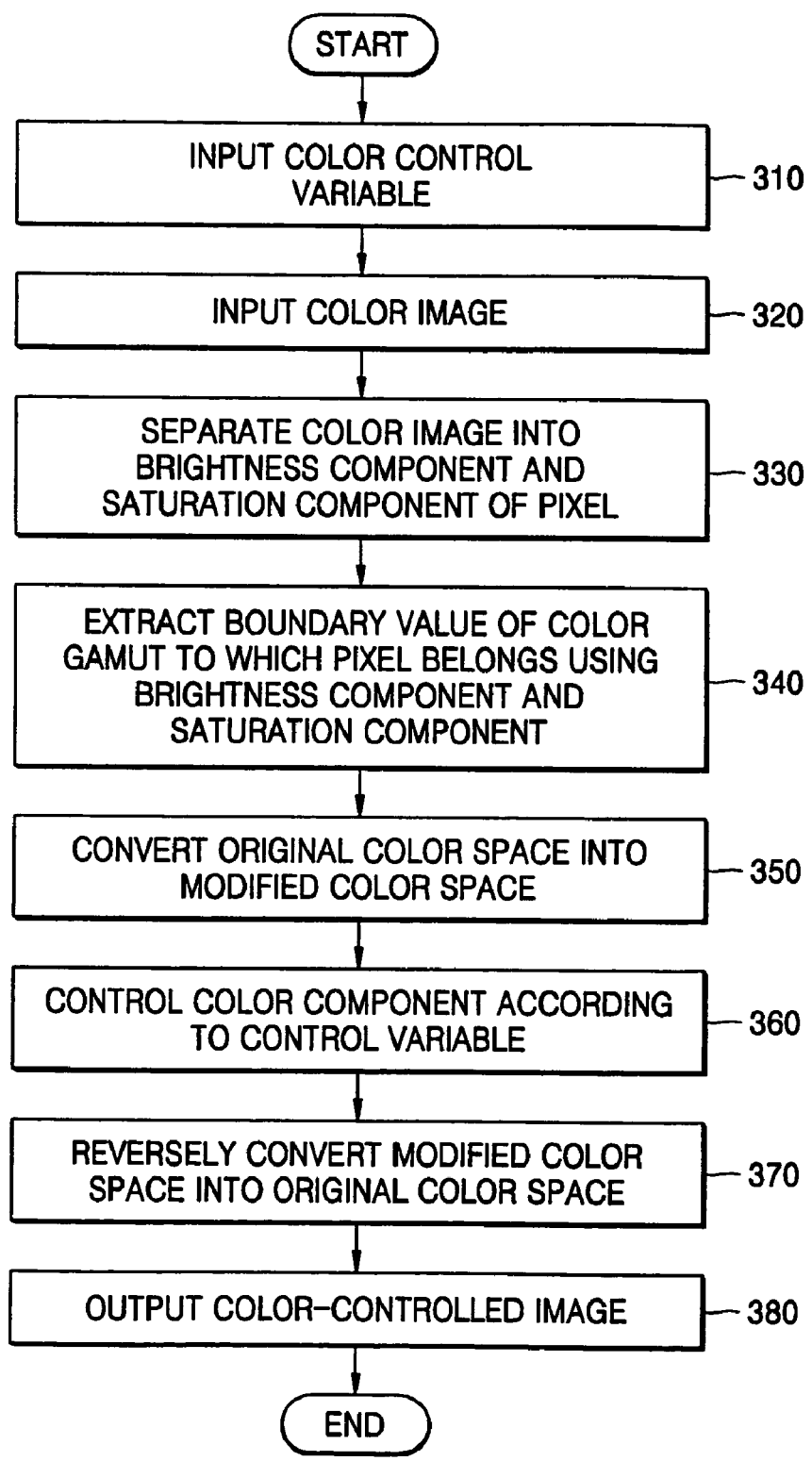
FIG. 3 is a flowchart illustrating a method of controlling colors of a color image according to an embodiment of the present invention.
Figure 4:
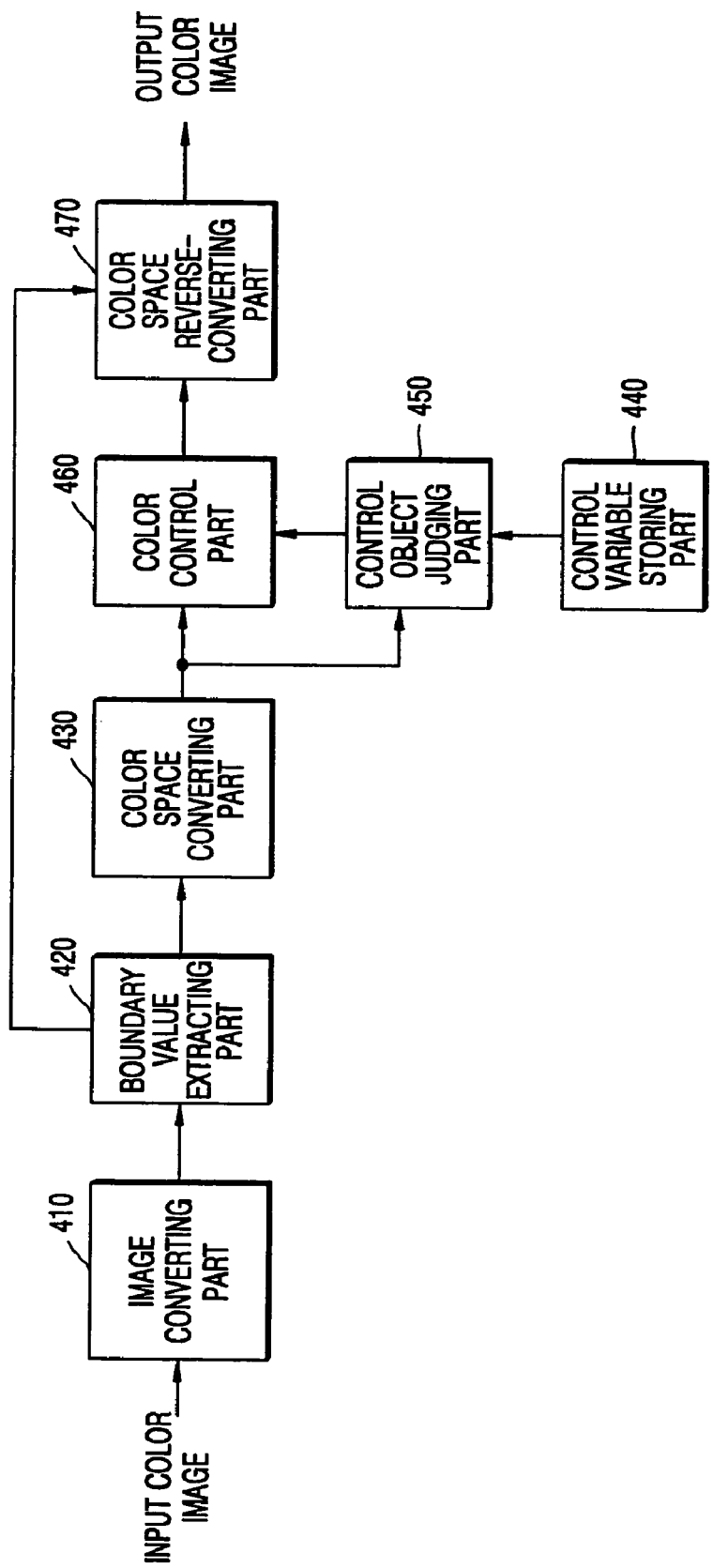
FIG. 4 is a block diagram illustrating an apparatus for controlling colors of a color image according to the embodiment of FIG. 3.
Figure 8:
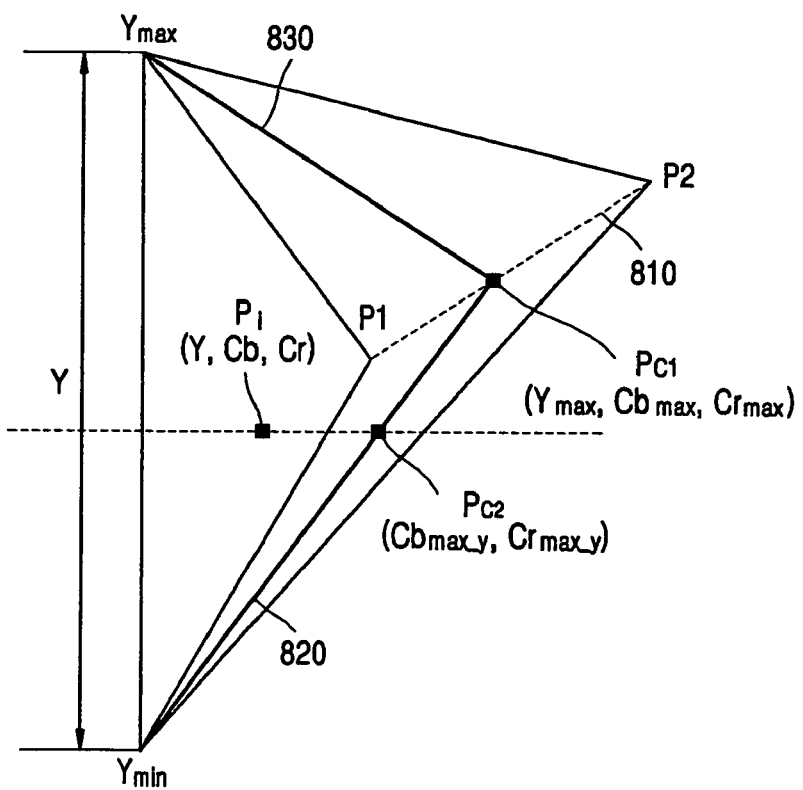
Figure 9:
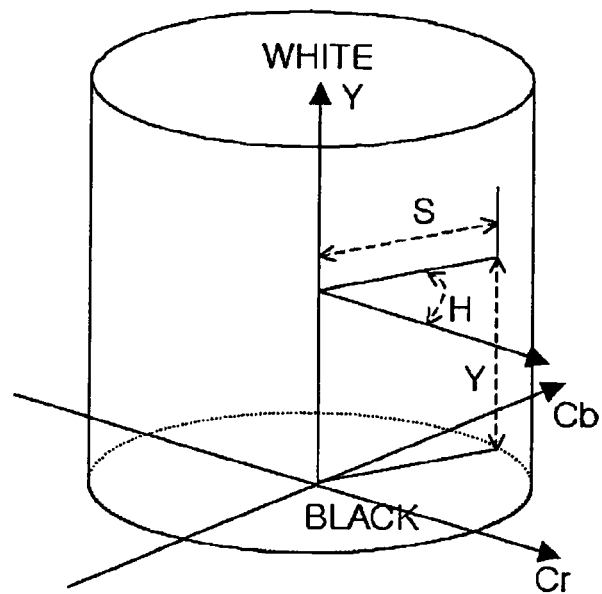
Figure 10:
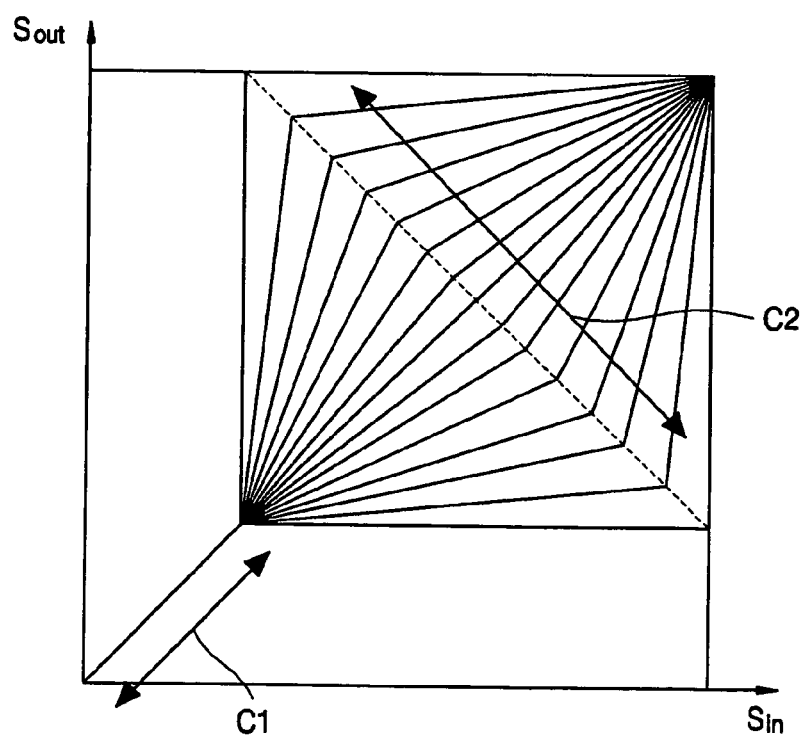
Figure 11:
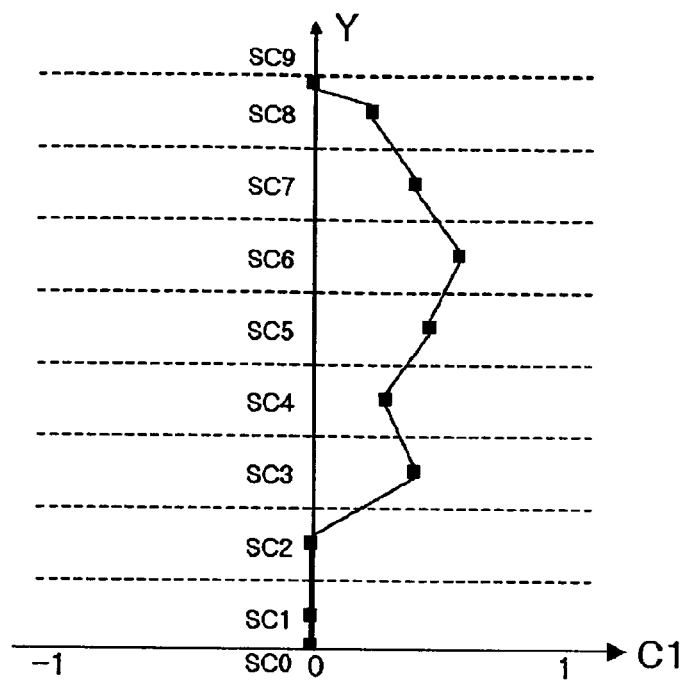
Figure 12:
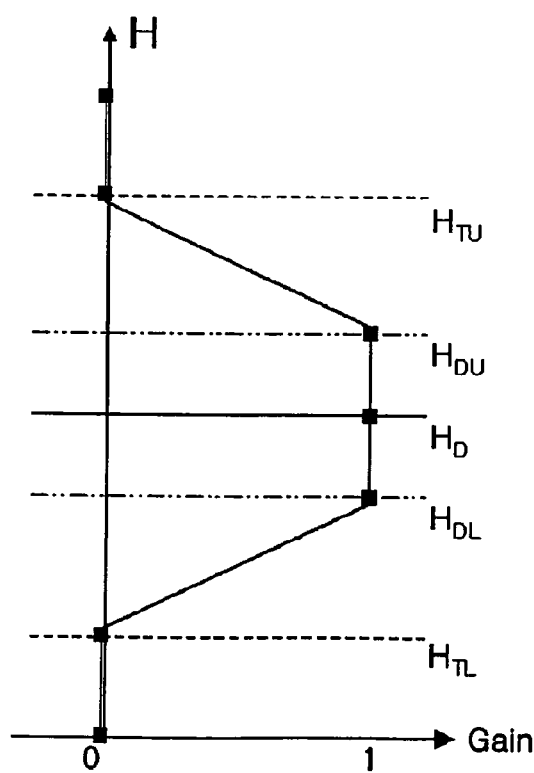
Figure 13:
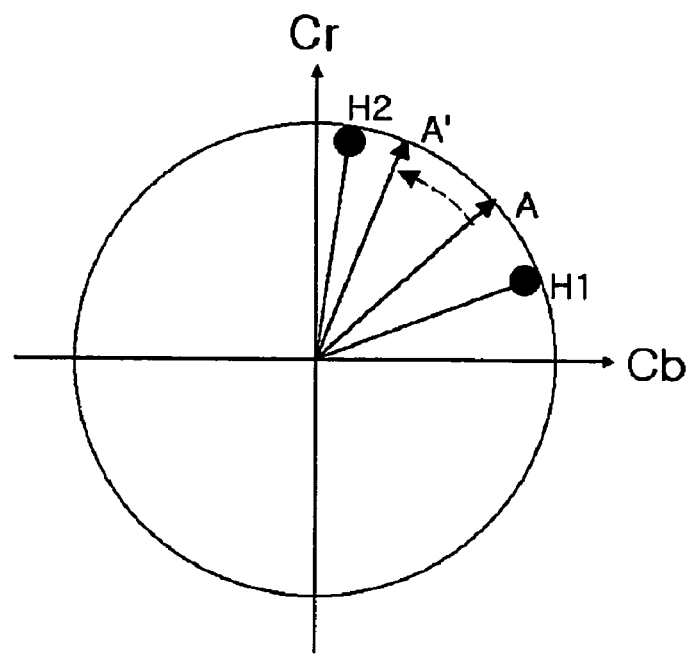
Figure 14:
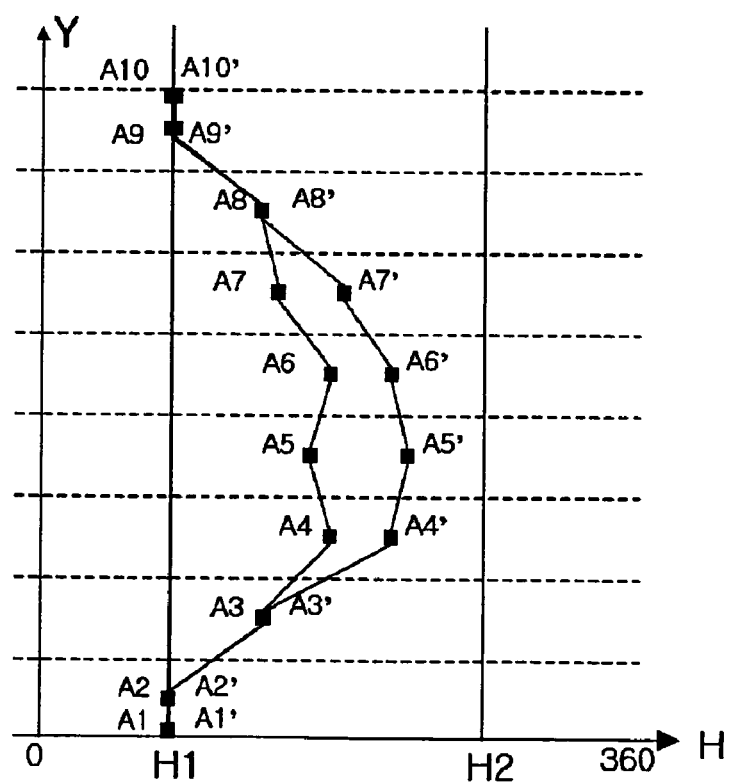

FIG, 7 is a diagram illustrating first through sixth color gamuts in an original YCbCr color space;

FIG. 8 is a diagram illustrating a process of obtaining the boundary value using three-dimensional coordinates of first and second primary colors included in a predetermined color gamut;

FIG. 9 is a diagram illustrating a modified YCbCr color space modified according to the embodiment of FIGS. 3 and 4;

FIG. 10 is a diagram illustrating an operation of controlling saturation, which is performed by a color control part in FIG. 4;

FIG. 11 is a diagram illustrating an operation of controlling saturation according to brightness on the basis of the operation of FIG. 10;

FIG. 12 is a diagram illustrating an operation of controlling saturation according to hue on the basis of the operation of FIG. 10;

FIG. 13 is a diagram illustrating an operation of controlling hue, which is performed by the color control part in FIG. 4; and FIG. 14 is a diagram illustrating an operation of controlling hue according to brightness on the basis of the operation of FIG. 13.

DETAILED DESCRIPTION OF EMBODIMENT

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 3 is a flowchart illustrating a method of controlling colors of a color image according to an embodiment of the present invention. The method includes color space converting operations 320 through 350, color control operations 310 and 360, and color space reverse-converting operations 370 and 380.

FIG. 4 is a block diagram illustrating an apparatus for controlling colors of a color image according to the embodiment of FIG. 3. The apparatus includes an image converting part 410, a boundary value extracting part 420, a color space converting part 430, a control variable storing part 440, a control object judging part 450, a color control part 460, and a color space reverse-converting part 470. The operation of the apparatus of FIG. 4 will be explained with reference to the flowchart shown in FIG. 3. Here, color control is performed pixel by pixel.

Referring to FIGS. 3 and 4, in operation 320, the image converting part 410 receives the color image. If a color signal of the input image is a red-green-blue (RGB) signal, the image converting part 410 converts the RGB signal into a YCbCr signal where Y represents a brightness component of a color, and Cb and Cr represent saturation components. On the other hand, if the color signal of the input image is the YCbCr signal, the image converting part 410 passes the YCbCr signal to the boundary value extracting part 420 without processing the YCbCr signal. The RGB signal is converted into the YCbCr signal through a matrix calculation as defined in Equation 1 according to ITU.BT-709 standards. In operation 330, the color signal of the input image is separated into a brightness component Y and saturation components Cr and Cb.

$$\begin{bmatrix} Y \\ Cb \\ Cr \end{bmatrix} = \begin{bmatrix} 0.2215 & 0.7154 & 0.0721 \\ -0.1145 & -0.3855 & 0.5 \\ 0.5016 & -0.4556 & -0.0459 \end{bmatrix} \begin{bmatrix} R \\ G \\ B \end{bmatrix} \quad \text{Equation 1}$$

In operation 340, the boundary value extracting part 420 extracts a boundary value ($Cb_{max\_y}$, $Cr_{max\_y}$) of a saturation component of a color gamut to which a given pixel belongs in an original YCbCr color space using the brightness component Y and the saturation components Cr and Cb of the given pixel provided from the image converting part 410. A maximum value of the saturation component while current brightness and hue of the given pixel is maintained in the original YCbCr color space can be obtained from the extracted boundary value. The boundary value extracting part 420 will be explained later with reference to FIGS. 5 and 6.

The color space converting part 430 normalizes the saturation component using the boundary value of the saturation component extracted by the boundary value extracting part 420. Accordingly, the original YCbCr color space in which a saturation component varies according to hue and brightness of each color is converted into a modified YCbCr color space in which the saturation component is constant according to all brightness and hue. To be more specific, the original YCbCr color space is converted into the modified YCbCr color space using a ratio between the boundary value of the saturation component of the color gamut to which the given pixel belongs and the saturation components Cr and Cb of the given pixel (operation 350 of FIG. 3). Saturation components Cr' and Cb' corresponding to the saturation components Cr and Cb of the given pixel in the modified YCbCr color space can be obtained as shown in Equation 2 using the boundary value ($Cb_{max\_y}$, $Cr_{max\_y}$) of the color gamut to which the given pixel belongs.

$$Cb' = Cb/Cb_{max\_y}$$

$$Cr' = Cr/Cr_{max\_y} \quad \text{Equation 2}$$

The modified YCbCr color space obtained by the color space converting part 430 is illustrated in FIG. 9. Referring to FIG. 9, in the modified YCbCr color space, a height represents a brightness component Y, a radial distance from a central axis represents a saturation component S, and an angular position from a reference axis, namely, a Cr axis, represents a hue component H. The color components of the given pixel may be expressed as values in the modified YCbCr color space according to Equation 3.

$$Y = Y \quad \text{Equation 3}$$

$$S = \sqrt{Cb'^2 + Cr'^2}$$

$$H = \arctan\left(\frac{Cb'}{Cr'}\right)$$

As shown in FIG. 9, since the modified YCbCr color space has a cylindrical shape in which a saturation value of a pixel is normalized to be 1 with respect to all brightness and hue, the saturation component S of the given pixel can be controlled independently of the hue component H and the brightness component Y, and the hue component H can be controlled independently of the brightness component Y Returning to FIGS. 3 and 4, the control variable storing part 440 stores a color control variable set by a manufacturer or a user (input at operation 310). The color control variable includes a saturation control variable that controls the saturation component and a hue control variable that controls the hue component. The saturation control variable includes a first variable C1, which designates a low saturation protection region (LSPR) where saturation control is not performed with respect to all brightness, and a second variable C2, which represents a degree of controlling saturation components in regions other than the LSPR. Further, when all brightness values are divided into predetermined sections, the saturation control variable may include a variable, which represents a degree of controlling a saturation component at each section. Furthermore, the saturation control variable includes a plurality of variables, which designate target hue whose saturation component S is to be controlled according to all brightness, a predetermined hue control region including the target hue, and a buffer region that prevents discontinuity between the hue control region and other remaining regions. On the other hand, the hue control variable includes a plurality of variables, which determine a hue control region within which the hue component is controlled according to all brightness. Further, when all the brightness values are divided into predetermined sections, the hue control variable includes a plurality of variables, which determine a hue control region within which the hue component is controlled at each section, target hue within the hue control region, and resultant hue. The hue control variable will be explained later with reference to FIGS. 10 through 14.

The control object judging part 450 judges whether the color components Y, S, and H of the given pixel obtained in the modified YCbCr color space are to be controlled with reference to the saturation control variable or the hue control variable, which are stored in the control variable storing part 440.

The color control part 460 controls the color components of the pixel, which is judged to be controlled by the control object judging part 450, using the color control variables stored in the control variable storing part in the modified YCbCr color space. Here, the colors are controlled pixel by pixel, to be specific, the saturation can be controlled according to the brightness or hue of each pixel, or the hue can be controlled according to the brightness of each pixel. Saturation control and hue control will be explained later with reference to FIGS. 10 through 14.

The color space reverse-converting part 470 reverse converts the modified YCbCr color space into the original YCbCr color space using the boundary value of the saturation component extracted by the boundary value extracting part 420, and obtains and outputs the color components of the image, which have been controlled in the original YCbCr color space. A color space reverse converting process is performed by performing the normalization process conducted by the color space converting part 430 in reverse. In further detail, after the boundary value ($Cb\_max$, $Cr\_max$) of the saturation component is calculated, the saturation component (Cb, Cr) of the given pixel is divided by the boundary value, that is, $Cb/Cb\_max$ and $Cr/Cr\_max$ are performed so as to conduct the normalization process and form the modified YCbCr color space. In the meantime, when it is assumed that $Cb'=Cb/Cb\_max$ and $Cr'=Cr/Cr\_max$, if an input saturation component is converted into an output saturation component by a given function, $(Cb', Cr')$ is converted into $(Cb'', Cr'')$ to control the saturation component. The value $(Cb'', Cr'')$ is multiplied by the boundary value, that is, $Cb'' \times Cb\_max$ and $Cr'' \times Cr\_max$ are performed. Accordingly, the values of Cr and Cb in the modified YCbCr color space is converted into the values of Cr and Cb in the original YCbCr color space. To sum up, the color space converting process is performed through division of the boundary value, and the color space reverse converting process is performed through multiplication of the boundary value.

Figure 5:
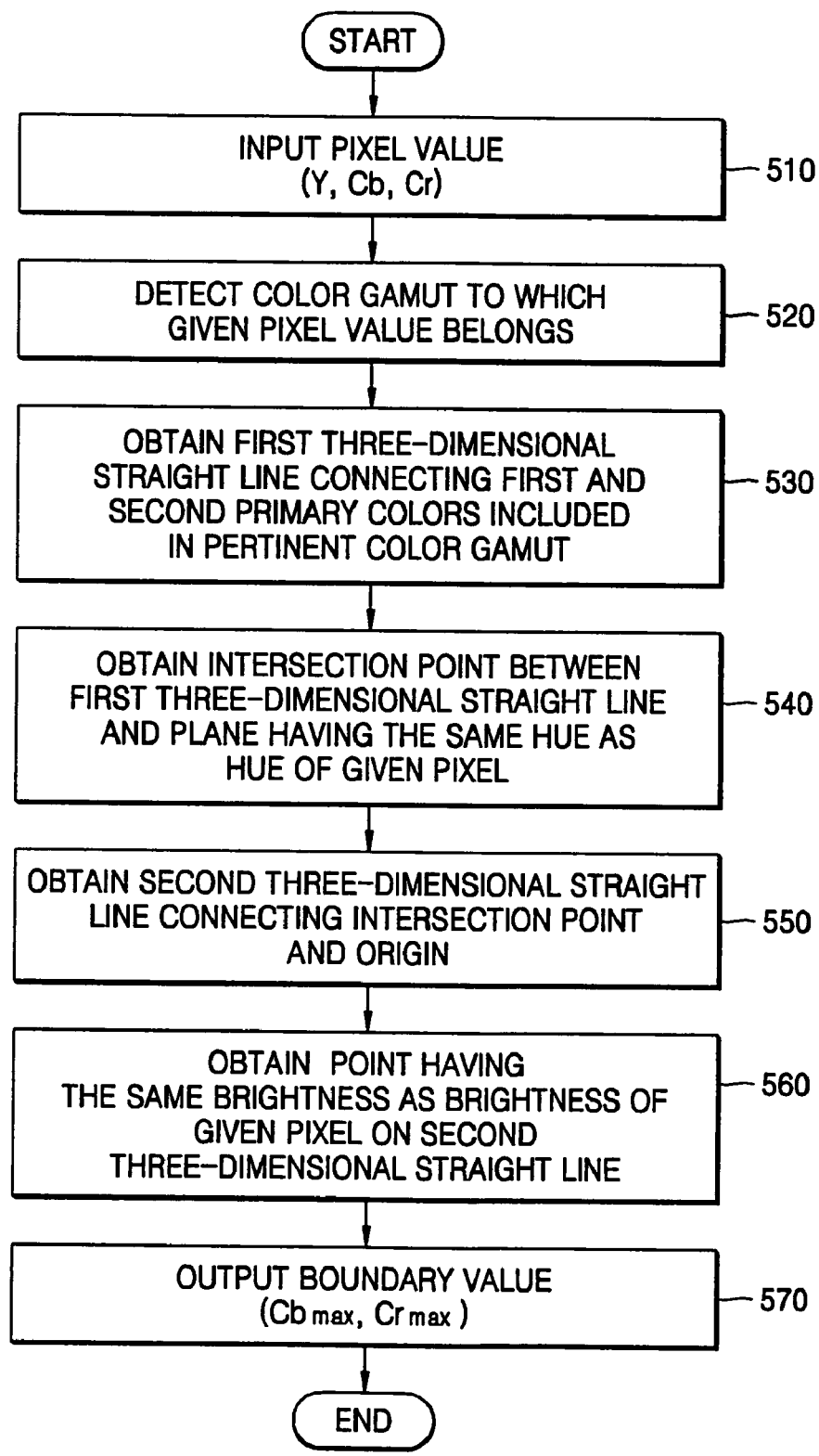
FIG. 5 is a detailed flowchart illustrating an operation of extracting a boundary value in the method of FIG. 3.

FIG. 5 is a flowchart illustrating an operation of extracting the boundary value in the method of FIG. 3. The boundary value extracting operation includes color gamut detecting operations 510 and 520, and boundary value obtaining operations 530 through 570.

Figure 6:
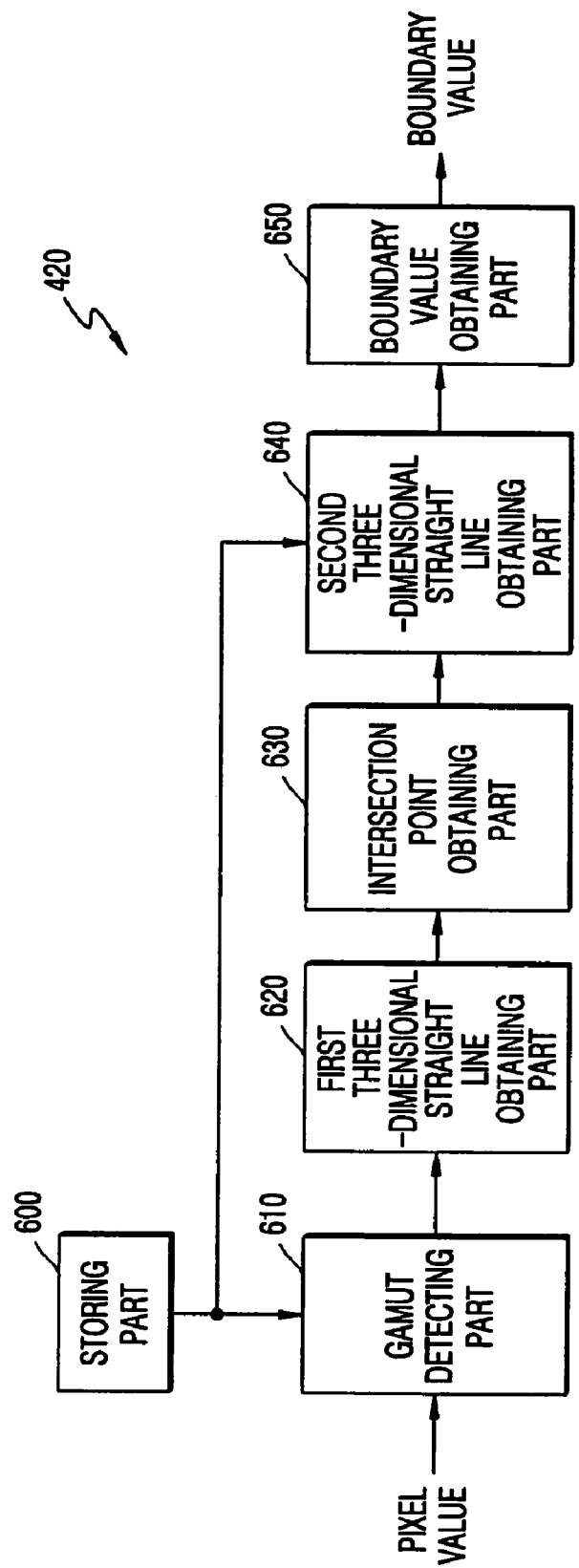
FIG. 6 is a detailed block diagram illustrating a boundary value extracting part of the apparatus of FIG. 4.

FIG. 6 is a detailed block diagram illustrating the boundary value extracting part 420. The boundary value extracting part 420 includes a storing part 600, a gamut detecting part 610, a first three-dimensional straight line calculating part 620, an intersection point calculating part 630, a second three-dimensional straight line calculating part 640, and a boundary value obtaining part 650. The operation of the boundary value extracting part 420 shown in FIG. 6 will be explained with reference to the flowchart of FIG. 5.

Figure 1:
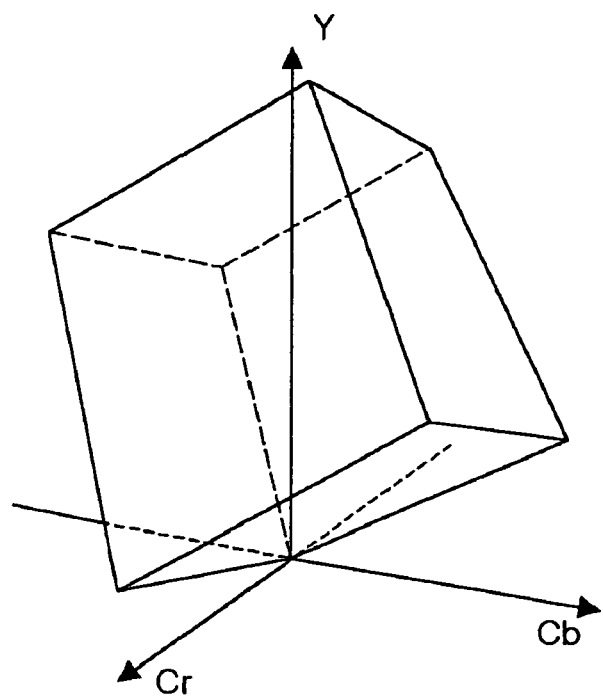
FIG. 1 is a diagram illustrating an original YCbCr color space.
Figure 2:
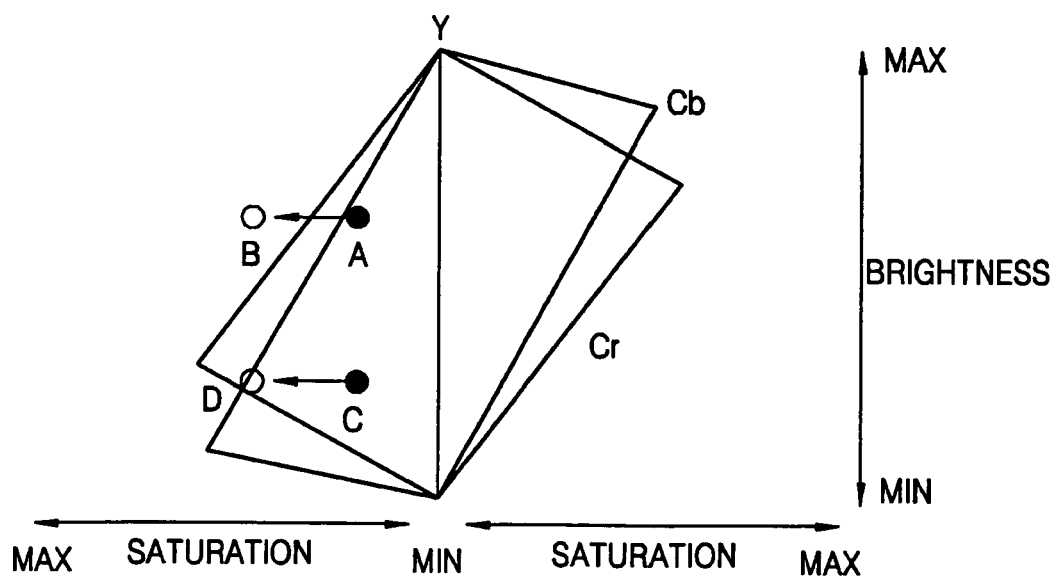
FIG. 2 is a diagram illustrating an exemplary color control in the original YCbCr color space.
Figure 7:
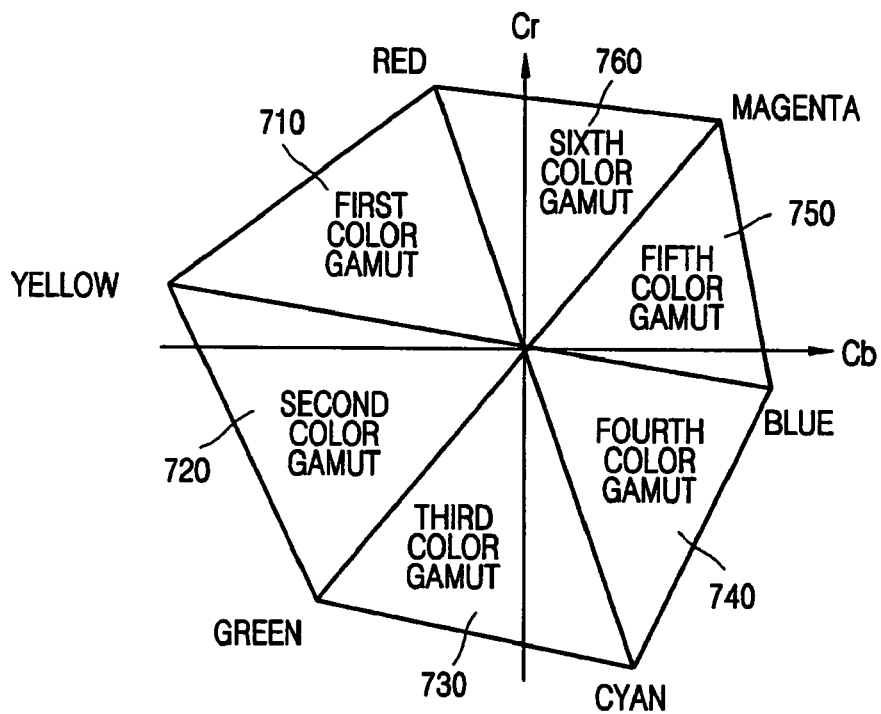

Referring to FIGS. 5 and 6, the storing part 600 stores three-dimensional coordinates (Y, Cb, Cr) of first and second primary colors P1 and P2 included in respective color gamuts that are formed by dividing the original YCbCr color space. Referring to FIG. 7, when the original YCbCr color space as shown in FIG. 1 is viewed from the above, the original color space has a hexagonal shape with apexes of six primary colors, namely, RED, MAGENTA, BLUE, CYAN, GREEN, and YELLOW, which represent six color gamuts. The hexagonal shape includes first through sixth color gamuts 710 through 760. The respective color gamuts have the first and second primary colors P1 and P2. For example, the first color gamut 710 has YELLOW as the first primary color P1 and RED as the second primary color P2. When a bit resolution of three-dimensional coordinates is 8 bit, a necessary storage capacity is 8 bit×3×6, which totals 18 bits.

In operation 510, the color signal (Y, Cb, Cr) of the given pixel is input to the gamut detecting part 610. In operation 520, the gamut detecting part 610 detects a color gamut to which the color signal of the given pixel belongs. Here, the color gamut to which the given pixel belongs is searched for using the saturation components Cr and Cb of the given pixel. To which of the first through sixth color gamuts 710 through 760 the color signal belongs is judged using saturation components $Cr_{p1}$ and $Cb_{p1}$ of the first primary color P1 and saturation components $Cr_{p2}$ and $Cb_{p2}$ of the second primary color P2 according to Equation 4. The saturation components of the first and second primary colors P1 and P2 are obtained from the three-dimensional coordinates of the first and second primary colors P1 and P2 read from the storing part 600.

$$\tan\frac{Cr_{P1}}{Cb_{P1}} < \tan\frac{Cr}{Cb} < \tan\frac{Cr_{P2}}{Cb_{P2}} \qquad \text{Equation 4}$$

That is, a color gamut including the first and second primary colors P1 and P2, in which the saturation component of the given pixel, that is, a tangent value with respect to the ratio of Cr and Cb satisfies Equation 4, is judged as the color gamut to which the color signal of the given pixel belongs.

In operation 530, the first three-dimensional straight line calculating part 620 selects the first and second primary colors P1 and P2 included in the color gamut that is judged by the gamut detecting part 610, and obtains a first three-dimensional straight line 810 that connects the selected first and second primary colors P1 and P2.

In operation 540, the intersection point calculating part 630 obtains a first intersection point $P_{c1}$ between the first three-dimensional straight line 810 obtained by the first straight line calculating part 620 and a plane having the same hue as the hue of the given pixel. In further detail, if the original YCbCr color space is converted into the modified YCbCr color space, the cylindrical color space as shown in FIG. 9 is achieved. Here, a height of the cylindrical color space represents brightness, and a radial distance from a central line of the cylindrical color space represents saturation. When the cylindrical color space is viewed from the above, a circle is shown. A line segment outwardly drawn from the center of the circle has a constant Cr/Cb ratio, namely, an inclination. Points on the line segment have the same hue. For example, a point having Cr=0.2 and Cb=0.4 and a point having Cr=0.3 and Cb=0.6 have the same hue because Cr/Cb=0.5. Since hue is independent of brightness, the value Y can be any one. A straight line in the circle that is obtained when the cylindrical color space is viewed from the above becomes a plane in the cylindrical color space. Therefore, a plane having the same Cr/Cb ratio as the given pixel is a plane on which pixels having the same hue as the hue of the given pixel are placed.

Returning to FIGS. 5 and 6, the second three-dimensional straight line calculating part 640 obtains second three-dimensional lines 820 and 830 of FIG. 8, which connect the first intersection point $P_{c1}$ obtained by the intersection calculating part 630 to starting points, namely, $(Y_{black}, 0, 0)$ and $(Y_{white}, 0, 0)$, respectively.

In operation 560, the boundary value obtaining part 650 obtains a second intersection point $P_{c2}$ having the same brightness as the brightness of the given pixel Pi on the second three-dimensional straight line, for example, 820, that is obtained by the second three-dimensional straight line calculating part 640. In operation 570, the boundary value obtaining part 650 outputs the boundary value ($Cb_{max\_y}$, $Cr_{max\_y}$) of the saturation component of the color gamut to which the given pixel belongs from three-dimensional coordinates of the second intersection point $P_{c2}$.

In more detail with reference to FIG. 8, the first three-dimensional straight line 810, which connects the three-dimensional data coordinates (Y, Cb, Cr) of the first and second primary colors P1 and P2, is obtained using the three-dimensional data coordinates (Y, Cb, Cr) of the first and second primary colors P1 and P2 included in the color gamut detected by the gamut detecting part 610. Next, the intersection point $P_{c1}$ between the first three-dimensional straight line 810 and the plane having the same hue as the hue of the given pixel is obtained, and the three-dimensional data ($Y_{max}$, $Cb_{max}$, $Cr_{max}$) of the intersection point $P_{c1}$ is obtained. Specifically, a plane having the same hue has a triangular shape, and accordingly, a saturation value varies according to brightness despite the same red color. For example, when a brightness value of a color WHITE is 1, if a red color having a brightness value of 0.5 has a maximum saturation value of 0.8, a red color having a brightness value of 0.4 can have a maximum saturation value of 0.9. That is, $Y_{max}$ signifies a brightness value when the saturation is highest. Referring to FIG. 8, the point of $P_{c1}$ represents the highest saturation according to hue, and thus the brightness of the point $P_{c1}$ becomes $Y_{max}$. Next, the boundary value ($Cb_{max\_y}$, $Cr_{max\_y}$) of the saturation component of the color gamut to which the given pixel belongs is obtained using a proportional relation between the brightness component Y of the given pixel Pi and the brightness component $Y_{max}$ of the intersection point $P_{c1}$ in a triangle formed by three points, (0, 0, 0), ($Y_{white}$, 0, 0), and ($Y_{max}$, $Cb_{max}$, $Cr_{max}$), which are placed on the plane having the same hue as the hue of the given pixel. Here, the proportional relation is expressed as shown in Equation 5.

$$Y : Y_{max} = Cb_{max\_y} : Cb_{max}$$

$$Y : Y_{max} = Cr_{max\_y} : Cr_{max} \quad \text{Equation 5}$$

FIG. 10 is a diagram illustrating an operation of controlling saturation with respect to signal brightness, which is performed by the color control part 460 in FIG. 4.

Referring to FIG. 10, an X axis, i.e., a $S_{in}$ axis, represents normalized saturation of each pixel in a given input image, and an y axis, i.e., a $S_{out}$ axis, represents normalized saturation of each pixel in a controlled image. A plurality of variables are used to control the saturation. Among them, a first variable C1 designates an LSPR that prevents a saturation change in a low saturation region, and a second variable C2 represents a degree of controlling saturation components of regions other than the LSPR. Here, the first variable C1 has a value ranging from 0 to 1. If the first variable C1 has a value of 0, it means that the low saturation region to be protected does not exist. Accordingly, the saturation of all pixels is controlled according to the second variable C2. On the contrary, if the first variable C1 has a value of 1, it is judged that all regions are the LSPR. Accordingly, the saturation of all the pixels is not controlled. The second variable C2 is used to control the saturation of the given pixel, and has a value ranging from −1 to 1. If the second variable C2 has a value of −1, the saturation of pixels, which do not belong to the LSPR, becomes the upper limit saturation of the LSPR. If the second variable C2 has a value of 1, the saturation of the pixels, which do not belong to the LSPR, has a value of 1. On the other side, when the second variable C2 has a value ranging from −1 to 1, as shown in FIG. 10, the space formed by the $S_{in}$ axis and the $S_{out}$ axis is divided into two regions, inclinations of the two regions are obtained, and a saturation component $S_{out}$ controlled using the inclinations is output. If the second variable C2 has a value of 0, the saturation component of the given pixel is not controlled but output as it is. The saturation controlling operation described with reference to FIG. 10 is exemplary, and thus, various modifications may be made.

The operation of controlling the saturation as shown in FIG. 10 is expressed as shown in Equation 6.

$$\text{if} \quad S_{in} \leq LSPR \quad \text{Equation 6}$$
$$S_{out} = S_{in}$$
$$\text{elseif} \quad LSPR < S_{in} \leq \frac{1+LSPR}{4}(2+SC)$$
$$S_{out} = \frac{2+6LSPR+SC(1+LSPR)}{2+6LSPR-SC(1+LSPR)}(S_{in}-LSPR)+LSPR$$
$$\text{elseif} \quad \frac{1+LSPR}{4}(2+SC) < S_{in} \leq 1$$
$$S_{out} = \frac{2+SC}{2-SC}(S_{in}-1)+1$$

Referring to Equation 6, a saturation component $S_{in}$ of the given pixel obtained by Equation 3 in the modified YCbCr color space is compared with the first variable designating the LSPR. If the saturation component $S_{in}$ of the given pixel is equal to or less than the first variable designating the LSPR, the controlled saturation component $S_{out}$ is equal to the saturation component $S_{in}$ of the given pixel. Accordingly, saturation control with respect to the saturation component $S_{in}$ of the given pixel is not performed. However, if the saturation component $S_{in}$ of the given pixel is greater than the first variable designating the LSPR, the space is divided into the two regions, saturation control is performed based on the inclinations of the two regions, and the controlled saturation component $S_{out}$ is output.

Conversely, the manufacturer or user can have the same first variable C1, which designates the LSPR, and the varying second variable C2, which represents the saturation control (SC), according to all brightness and hue.

FIG. 11 is a diagram illustrating an operation of controlling saturation according brightness on the basis of the operation of FIG. 10. The second variable varies according to brightness. Referring to FIG. 11, all brightness values are divided into 8 sections, middle values of the respective sections are determined as second variables SC1 through SC8, and second variables existing between the middle values of the respective sections are determined through a linear interpolation performed by connecting the middle values of the respective sections. Here, the second variables of a minimum brightness section $Y_{BLACK}$, a maximum brightness section $Y_{WHITE}$, and first and second sections have a value of 0, and accordingly, saturation control is not performed.

Here, the brightness sections can be arbitrarily determined by the manufacturer or user.

FIG. 12 is a diagram illustrating an operation of controlling saturation according to hue on the basis of the operation of FIG. 10. The second variables vary according to hue. Referring to FIG. 12, a range of a hue component whose saturation is to be controlled is determined using three variables relating to hue. The three variables relating to hue may be target hue Ht, a target margin angle Ata, and a transition margin angle Atr. A relation between the Ht, Ata and Atr, and $H_D$, $H_{DU}$, $H_{DL}$, $H_{TU}$, and $H_{TL}$ shown in FIG. 12 is expressed as shown in Equation 7.

$$H_{TU} = Ht + Ata + Atr$$

$$H_{DU} = Ht + Ata$$

$$H_D = Ht$$

$$H_{DL} = Ht - Ata$$

$$H_{TL} = Ht - Ata - Atr \qquad \text{Equation 7}$$

Here, a region from $H_{DU}$ to $H_{DL}$ represents a hue control region including the target hue Ht, namely, $H_D$, a region from $H_{TU}$ to $H_{DU}$ and a region from $H_{DL}$ to $H_{TL}$ represent buffer regions for preventing discontinuity between the hue control region and other remaining regions.

As a result, the values of the second variables applicable to each pixel are determined as shown in Equation 8.

$$SC = SC_{Lightness} \times SC_{Hue} \qquad \text{Equation 8}$$
$$= SC_a \times SC_{Gain}$$

Here, $SC_{brightness}$ signifies a value $SC_a$ of a second variable that varies according to brightness, and $SC_{Hue}$ signifies a gain $SC_{Gain}$ of a second variable that varies according to applied hue. The value $SC_a$ has a value ranging from −1 to 1, and the gain $SC_{Gain}$ has a value ranging from 0 to 1.

FIG. 13 is a diagram illustrating an operation of controlling hue with respect to fixed brightness, which is performed by the color control part 460 in FIG. 4.

Referring to FIG. 13, four values are used to control the hue. Two values are variables used for determining a range of a hue component to be controlled, and the other two values are variables used for designating target hue to be changed and resultant hue after change. Here, the variables used for designating the target hue and the resultant hue must lie within the hue control range.

Hue control is performed independently of the brightness of the given pixel. The manufacturer or user may have the same ranges H1 and H2 of the hue component to be controlled according to all brightness, and have varying variables representing target hue A and resultant hue A'. Referring to FIG. 13, the range of the hue component to be controlled is designated, such that only a hue component of a pixel within the range is controlled without altering other color components, i.e., brightness and saturation components, of the pixel within the range. Here, when the hue A is controlled to become the hue A', hue components present between the hue control ranges H1 and H2 are changed within the hue control ranges in proportion to the change of the hue A to the hue A'.

The hue controlling operation described with reference to FIG. 13 is expressed as shown in Equation 9.

$$\text{if} \quad H1 \le H_{in} < A \qquad \text{Equation 9}$$
$$H_{out} = \frac{A' - H1}{A - H1} \times H_{in} + H1$$
$$\text{elseif} \quad A \le H_{in} < H2$$
$$H_{out} = H2 - \frac{H2 - A'}{H2 - A} \times H_{in}$$

Referring to Equation 9, depending on whether a hue component $H_{in}$ of the given pixel obtained by Equation 3 in the modified YCbCr color space is present between the hue control range H1 and the hue A, or between the hue A and the hue control range H2, a hue component $H_{out}$ is controlled and output.

FIG. 14 is a diagram illustrating an operation of controlling hue according to brightness on the basis of the operation of FIG. 13. The hue is controlled independently of the brightness of the given pixel.

Referring to FIG. 14, the hue control ranges, namely, H1 and H2, are determined, and all brightness values are divided into eight sections such that middle values of the respective sections are set to hue control variables of target hue components A1 through A8 and resultant hue components A1' through A8' corresponding to the target hue components A1 through A8. Hue control variables existing between the middle values of respective sections are determined through a linear interpolation performed by connecting the middle values of the respective sections. Here, at a minimum brightness section $Y_{BLACK}$, a maximum brightness section $Y_{WHITE}$, first and second brightness sections, and seventh and eighth brightness sections, hue control is not performed.

Embodiments of the present invention may be embodied in a general purpose digital computer by running a program form a computer usable medium, including but not limited to storage media such as magnetic storage media (e.g., ROMs, RAMs, floppy discs hard discs, etc.), and optically readable media (e.g., CD-ROMs, DVDs, etc.). The computer readable recording medium can be dispersively installed in a computer system connected to a network, and stored and executed as a computer readable code in a distributed computing environment. Functional programs, codes, and code segments used for executing embodiments of the present invention are also contemplated.

As described above, the original YCbCr color space to which the pixel of the color image belongs is expanded and converted into the modified YCbCr color space in which the respective color components are independent. Consequently, the saturation can be controlled according to the brightness or hue of the given pixel, and the hue can be controlled according to the brightness of the given pixel, in the modified YCbCr color space. In other words, a specific color can be finely controlled in a color image, which is provided independently of an image display. Accordingly, the present invention can eliminate a color difference between diverse displays due to different spectral characteristics, and allow the user to convert a specific color displayed by the display into a desired color.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of converting a color space, comprising:
   separating a color signal of a given pixel into a brightness component and a saturation component;
   obtaining a boundary value of the saturation component of a color gamut, to which the color signal belongs, in a first color space using the separated brightness component and saturation components; and
   converting the first color space into a second color space in which saturation components and hue components are independently controlled by normalizing the saturation component of the given pixel using the obtained boundary value.

2. The method of claim 1, wherein obtaining the boundary value includes:
   storing three-dimensional coordinates of first and second primary colors included in respective color gamuts that are formed by dividing the first color space;

detecting the color gamut to which the color signal belongs in the first color space using the saturation component; and obtaining the boundary value with respect to the brightness component using three-dimensional coordinates of the first and the second primary colors included in the color gamut to which the color signal belongs.

3. The method of claim 2, wherein obtaining the boundary value includes:

obtaining a first straight line using the three-dimensional coordinates of the first and second primary colors included in the color gamut to which the color signal belongs;

obtaining a first intersection point between the first straight line and a plane having the same hue component as a hue component of the given pixel;

obtaining a second straight line connecting the obtained first intersection point, first three-dimensional coordinates (Yblack, 0, 0), and second three-dimensional coordinates (Ywhite, 0, 0); and obtaining a second intersection point having the same brightness component as the brightness component on the second straight line, and obtaining the boundary value of the color gamut to which the given pixel belongs from three-dimensional coordinates of the second intersection point.

4. A computer readable recording medium encoded with processing instructions for causing a processor to execute a method of controlling color components of an input color image pixel by pixel, the method comprising:

obtaining a boundary value of a saturation component of a color gamut to which a color signal of a given pixel belongs in a first color space, and converting the first color space into a second color space in which saturation components by normalizing the saturation component of the given pixel and hue components are independently controlled using the obtained boundary value;

controlling color components according to a predetermined control variable in the second color space; and reversely converting the second color space into the first color space using the boundary value and outputting the color signal whose color components have been controlled.

5. A computer readable recording medium encoded with processing instructions for causing a processor to perform a method of converting a color space, the method comprising:

separating a color signal of a given pixel into a brightness component and a saturation component;

obtaining a boundary value of the saturation component of a color gamut, to which the color signal of the pixel belongs, in a first color space using the separated brightness component and saturation component; and converting the first color space into a second color space by normalizing the saturation component of the given pixel using the obtained boundary value of the saturation component.

6. An apparatus for controlling color components of an input color image pixel by pixel, comprising:

a color space converting unit which obtains a boundary value of a saturation component of a color gamut to which a color signal of a given pixel belongs in a first color space, and converts the first color space into a second color space in which saturation components and hue components are independently controlled using the obtained boundary value;

a color component control unit which controls color components of the given pixel according to a predetermined control variable in the second color space; and a color space reverse-converting unit which reversely converts the second color space into the first color space by normalizing the saturation component of the given pixel using the boundary value and outputs the color signal whose color components have been controlled by the color component control unit.

7. The apparatus of claim 6, wherein the color space converting unit includes:

a boundary value extracting part which obtains the boundary value of the color gamut to which the color signal belongs in the first color space using a brightness component and a saturation component, which are separated from the color signal; and a color space converting part which normalizes the saturation component using the boundary value of the obtained saturation component and converts the first color space into the second color space.

8. The apparatus of claim 7, wherein the boundary value extracting part includes:

a storing part which stores three-dimensional coordinates of first and second primary colors included in respective color gamuts that are formed by dividing the first color space;

a color gamut detecting part which detects the color gamut to which the color signal belongs in the first color space using the saturation component; and a boundary value obtaining part which obtains the boundary value with respect to the brightness component using the three-dimensional coordinates of first and second primary colors included in the color gamut to which the color signal belongs among the three-dimensional coordinates of the first and second primary colors stored in the storing part.

9. The apparatus of claim 6, wherein the color control unit includes:

a control variable storing part which stores at least one of a saturation control variable that controls the saturation component and a hue control variable that controls a hue component;

a control object judging part which judges whether the color components should be controlled with reference to the saturation control variable or the hue control variable; and a color control part which controls the color components according to the saturation control variable or the hue control variable stored in the control variable storing part, when the color object judging part judges that the color components should be controlled.

10. The apparatus of claim 9, wherein the color control part divides all brightness values into predetermined sections and controls the hue component according to a plurality of variables, which determine a hue control range within which the hue component is controlled at each section, a target hue, and a resultant hue.

11. The apparatus of claim 10, wherein the saturation control variable includes a first variable that designates a low saturation protection region where saturation control is not performed with respect to all brightness, and a second variable that represents a degree of controlling saturation components of regions other than the low saturation protection region.

12. The apparatus of claim 10, wherein, when all brightness values are divided into predetermined sections, the saturation control variable includes a first variable that designates a low saturation protection region where saturation control is not performed at each section, and a second variable that represents a degree of controlling saturation components of regions other than the low saturation protection region.

13. The apparatus of claim 10, wherein the saturation control variable includes a plurality of variables which designate a target hue whose saturation component is to be controlled according to all brightness values, a hue control region including the target hue, and a buffer region that prevents discontinuity between the hue control region and other remaining regions.

14. The apparatus of claim 10, wherein the hue control variable includes a plurality of variables which determine a hue control range within which the hue component is controlled according to all brightness values, a target hue within the hue control range, and a resultant hue.

15. The apparatus of claim 10, wherein, when all brightness values are divided into predetermined sections, the hue control variable includes a plurality of variables which determine a hue control range within which the hue component is controlled at each section, a target hue, and a resultant hue.

16. The apparatus of claim 10, wherein the color control part controls the saturation component according to a first variable that designates a low saturation protection region where saturation control is not performed with respect to all brightness values in the second color space and a second variable that represents a degree of controlling saturation components of regions other than the low saturation protection region.

17. The apparatus of claim 10, wherein the color control unit divides all brightness values into predetermined sections in the second color space, and controls the saturation component according to a first variable that designates a low saturation protection region where saturation control is not controlled at each section and a second variable that represents a degree of controlling saturation components of regions other than the low saturation region.

18. The apparatus of claim 10, wherein the color control part controls the saturation component according to a plurality of variables which designate a target hue whose saturation component is to be controlled according to all brightness values in the second color space, a hue control region including the target hue, and a buffer region that prevents a discontinuity between the hue control region and other remaining regions.

19. The apparatus of claim 10, wherein the color control part controls the hue component according to a plurality of variables which determine a hue control range within which the hue component is controlled according to all brightness in the second color space, a target hue within the hue control range, and a resultant hue.

20. A method of controlling color components of an input color image pixel by pixel, comprising:
obtaining a boundary value of a saturation component of a color gamut to which a color signal of a given pixel belongs in a first color space, and converting the first color space into a second color space in which saturation components and hue components are independently controlled using the obtained boundary value;
controlling color components according to a predetermined control variable in the second color space; and
reversely converting the second color space into the first color space by normalizing the saturation component of the given pixel using the boundary value and outputting the color signal whose color components have been controlled.

21. The method of claim 20, wherein obtaining the boundary value includes:
separating the color signal into a brightness component and the saturation component;
obtaining the boundary value of the color gamut to which the color signal belongs in the first color space using the separated brightness component and saturation component; and
normalizing the saturation component using the obtained boundary value and converting the first color space into the second YCbCr color space.

22. The method of claim 21, wherein obtaining the boundary value includes:
detecting the color gamut to which the color signal belongs in the first color space using the saturation component; and
obtaining the boundary value with respect to the brightness component using three-dimensional coordinates of first and second primary colors included in the color gamut to which the color signal belongs.

23. The method of claim 20, wherein, in controlling the pixel color component, the control variable includes at least one of a saturation control variable that controls the saturation component, and a hue control variable that controls a hue component.

24. The method of claim 23, wherein controlling the pixel color component includes controlling the saturation component according to brightness and hue using the saturation control variable in the second color space.

25. The method of claim 23, wherein controlling the pixel color component includes controlling the hue component according to brightness using the hue control variable in the second color space.

26. The method of claim 23, wherein the saturation control variable includes a first variable that designates a low saturation protection region where saturation control is not performed with respect to all brightness values, and a second variable that represents a degree of controlling saturation components of regions other than the low saturation protection region.

27. The method of claim 23, wherein, when all brightness values are divided into predetermined sections, the saturation control variable includes a first variable that designates a low saturation protection region where saturation control is not performed at each section and a second variable that represents a degree of controlling saturation components of regions other than the low saturation protection region.

28. The method of claim 23, wherein the saturation control variable includes a plurality of variables which designate target hue whose saturation component is to be controlled according to all brightness, a hue control region including the target hue, and a buffer region that prevents discontinuity between the hue control region and other remaining regions.

29. The method of claim 23, wherein the hue control variable includes a plurality of variables which determine a hue control range within which the hue component is controlled according to all brightness values, a target hue within the hue control range, and a resultant hue.

30. The method of claim 23, wherein, when all brightness values are divided into predetermined sections, the hue control variable includes a plurality of variables, which determine a hue control range within which the hue component is controlled at each section, a target hue, and a resultant hue.

31. The method of claim 23, wherein controlling the pixel color component includes controlling the saturation component according to brightness using the saturation control variable in the second color space.

32. The method of claim 23, wherein controlling the pixel color component includes controlling the saturation component according to hue using the saturation control variable in the second color space.

33. A method of controlling colors of a color image, comprising:
inputting a color control variable;
inputting the color image;
separating the input color image into a brightness component (Y) and saturation components (Cr, Cb) of a pixel;
extracting a boundary value (Cbmax_y, Crmax_y) of the saturation component of a color gamut to which the pixel belongs in an original YCbCr color space using the brightness component and the saturation components;
converting the original color space into a modified YCbCr color space by normalizing the saturation component of the pixel using the extracted boundary value;
controlling color components of the pixel using the color control variable; and
reverse-converting the modified color space into the original color space.

34. The method of claim 33, further comprising determining the color gamut to which the given pixel belongs.

35. The method of claim 34, wherein the determining the color gamut to which the given pixel belongs is performed using saturation components Crp1 and Cbp1 of a first primary color P1 and saturation components Crp2, and Cbp2 of a second primary color P2 according to the following equation $$\tan\frac{Cr_{P1}}{Cb_{P1}} < \tan\frac{Cr}{Cb} < \tan\frac{Cr_{P2}}{Cb_{P2}}.$$

36. The method of claim 33, wherein, a saturation component of the original YCbCr color space varies according to a hue and a brightness of each color, the saturation component of the modified YCbCr color space is constant according to all brightness values and hues, and the converting uses a ratio between the boundary value and the saturation components Cr and Cb.

37. The method of claim 33, wherein, when the input color signal is a red-green-blue (RGB) signal, the inputting a color image includes converting the RGB signal into a YCbCr signal.

38. The method of claim 37, wherein the converting uses a matrix calculation defined by the following equation according to ITU.BT-709 standards $$\begin{bmatrix} Y \\ Cb \\ Cr \end{bmatrix} = \begin{bmatrix} 0.2215 & 0.7154 & 0.0721 \\ -0.1145 & -0.3855 & 0.5 \\ 0.5016 & -0.4556 & -0.0459 \end{bmatrix} \begin{bmatrix} R \\ G \\ B \end{bmatrix}.$$

39. The method of claim 33, wherein the color components include the brightness component (Y), a hue component (S) and the saturation component (S), and the color components are expressible as values in the modified YCbCr color space according to following equation $$Y = Y$$
$$S = \sqrt{Cb'^2 + Cr'^2}$$
$$H = \arctan\left(\frac{Cb'}{Cr'}\right).$$

40. The method of claim 33, wherein Cr' and Cb' are saturation components corresponding to the saturation components Cr and Cb of the pixel in the modified YCbCr color space and are obtained by the following equation using the boundary value $$Cb'=Cb/Cb_{max\_y}$$
$$Cr'=Cr/Cr_{max\_y}.$$

41. The method of claim 33, wherein the color control variable includes a saturation control variable that controls the saturation component and a hue control variable that controls the hue component.

42. The method of claim 41, wherein, when all of the brightness values are divided into predetermined sections, the hue control variable includes a plurality of variables which determine a hue control region within which the hue component is controlled at each section, a target hue within the hue control region, and a resultant hue.

43. The method of claim 41, wherein the saturation control variable includes a first variable C1 designating a low saturation protection region (LSPR) where saturation control is not performed with respect to all brightness values, and a second variable C2 representing a degree of controlling saturation components in regions other than the LSPR.

44. The method of claim 41, wherein, when all brightness values are divided into predetermined sections, the saturation control variable includes a variable representing a degree of controlling a saturation component at each section.

45. The method of claim 41, wherein the saturation control variable includes a plurality of variables designating target hue whose saturation component is to be controlled according to all brightness values, a predetermined hue control region including a target hue, and a buffer region that prevents discontinuity between the hue control region and other remaining regions.

46. The method of claim 41, wherein the hue control variable includes a plurality of variables which determine a hue control region within which the hue component is controlled according to all brightness.

* * * * *

UNITED STATES PATENT AND TRADEMARK OFFICE
CERTIFICATE OF CORRECTION

PATENT NO.       : 7,545,533 B2
APPLICATION NO.  : 10/993158
DATED            : June 9, 2009
INVENTOR(S)      : Hyun-wook Ok et al.

It is certified that error appears in the above-identified patent and that said Letters Patent is hereby corrected as shown below:

Column 13, Line 19, change "(Yblack," to --($Y_{black}$,--.

Column 13, Line 20, change "(Ywhite," to --($Y_{white}$,--.

Column 14, Line 58, change "10," to --9,--.

Column 14, Line 65, change "10," to --9,--.

Column 15, Line 5, change "10," to --9,--.

Column 15, Line 12, change "10," to --9,--.

Column 15, Line 17, change "10," to --9,--.

Column 15, Line 22, change "10," to --9,--.

Column 15, Line 30, change "10," to --9,--.

Column 15, Line 38, change "10," to --9,--.

Column 15, Line 46, change "10," to --9,--.

Column 17, Line 26, change "Crp1" to --$Cr_{p1}$--.

Column 17, Line 26, change "Cbp1" to --$Cb_{p1}$--.

Column 17, Line 27, change "Crp2," to --$Cr_{p2}$,--.

Column 17, Line 27, change "Cbp2" to --$Cb_{p2}$--.

Signed and Sealed this
Thirtieth Day of August, 2011

David J. Kappos
*Director of the United States Patent and Trademark Office*